(12) United States Patent
Ford et al.

(10) Patent No.: US 6,313,236 B1
(45) Date of Patent: *Nov. 6, 2001

(54) PROCESS FOR PRODUCING POLYOLEFINS

(75) Inventors: Randal Ray Ford; Kenneth Alan Dooley; Jeffrey James Vanderbilt; Roxanna Lea Whitfield; Alan George Wonders, all of Longview, TX (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/387,599

(22) Filed: Aug. 31, 1999

Related U.S. Application Data

(60) Provisional application No. 60/126,909, filed on Mar. 30, 1999.

(51) Int. Cl.$^7$ .............................. C08F 2/00; C08F 10/00
(52) U.S. Cl. .................. 526/74; 526/106; 526/142; 526/144; 526/170; 526/171; 526/172; 526/204; 526/206; 526/209; 526/901
(58) Field of Search .............................. 526/74, 142, 204, 526/209, 901, 106, 144, 170, 171, 172, 206

(56) References Cited

U.S. PATENT DOCUMENTS

| | | |
|---|---|---|
| 3,709,853 | 1/1973 | Karapinka . |
| 4,003,712 | 1/1977 | Miller . |
| 4,011,382 | 3/1977 | Levine et al. . |
| 4,012,573 | 3/1977 | Trieschmann et al. . |
| 4,076,698 | 2/1978 | Anderson et al. . |
| 4,115,639 * | 9/1978 | Brown et al. ........................ 526/130 |
| 4,243,619 * | 1/1981 | Fraser et al. ...................... 526/901 X |
| 4,302,566 | 11/1981 | Karol et al. . |
| 4,532,311 | 7/1985 | Fulks et al. . |
| 4,543,399 | 9/1985 | Jenkins, III et al. . |
| 4,564,647 | 1/1986 | Hayashi et al. . |
| 4,673,719 | 6/1987 | Kioka et al. . |
| 4,701,505 * | 10/1987 | Fujii et al. ........................ 526/142 X |
| 4,716,206 | 12/1987 | Fujita et al. . |
| 4,739,015 | 4/1988 | Toyota et al. . |
| 4,752,597 | 6/1988 | Turner . |
| 4,792,592 | 12/1988 | Fulks et al. . |
| 4,803,251 | 2/1989 | Goode et al. . |
| 4,855,370 | 8/1989 | Chirillo et al. . |
| 4,876,320 | 10/1989 | Fulks et al. . |
| 4,882,400 | 11/1989 | Dumain et al. . |
| 5,026,795 | 6/1991 | Hogan . |
| 5,034,479 | 7/1991 | Eisinger et al. . |
| 5,055,535 | 10/1991 | Spitz et al. . |
| 5,106,804 | 4/1992 | Bailly et al. . |
| 5,132,380 | 7/1992 | Stevens et al. . |
| 5,162,463 | 11/1992 | Baker et al. . |
| 5,194,526 | 3/1993 | Hussein et al. . |
| 5,200,477 | 4/1993 | Baker et al. . |
| 5,210,161 * | 5/1993 | Smith et al. ........................ 526/129 |
| 5,227,440 | 7/1993 | Canich et al. . |
| 5,229,076 | 7/1993 | Fagher . |
| 5,283,278 | 2/1994 | Daire et al. . |
| 5,296,565 | 3/1994 | Ueda et al. . |
| 5,324,800 | 6/1994 | Welborn, Jr. et al. . |
| 5,331,071 | 7/1994 | Kataoka et al. . |
| 5,332,706 | 7/1994 | Nowlin et al. . |
| 5,350,723 | 9/1994 | Neithamer et al. . |
| 5,352,749 | 10/1994 | DeChellis et al. . |
| 5,385,991 | 1/1995 | Yamaguchi et al. . |
| 5,399,635 | 3/1995 | Neithamer et al. . |
| 5,416,175 | 5/1995 | Song et al. . |
| 5,420,220 * | 5/1995 | Cheruvu et al. .................. 526/348.1 |
| 5,432,236 | 7/1995 | Sano et al. . |
| 5,466,766 | 11/1995 | Patsidis et al. . |
| 5,468,702 | 11/1995 | Jejelowo . |
| 5,474,962 | 12/1995 | Takahashi et al. . |
| 5,541,270 | 7/1996 | Chinh et al. . |
| 5,578,537 | 11/1996 | Herrmann et al. . |
| 5,625,012 | 4/1997 | Hussein et al. . |
| 5,677,375 | 10/1997 | Rifi et al. . |
| 5,731,392 | 3/1998 | Ali et al. . |
| 5,777,120 | 7/1998 | Jordan et al. . |
| 5,780,379 | 7/1998 | Fiasse . |
| 5,834,571 | 11/1998 | Bernier et al. . |
| 5,863,853 | 1/1999 | Vaughan et al. . |
| 5,866,663 | 2/1999 | Brookhart et al. . |
| 5,883,203 | 3/1999 | Cheruvu et al. . |
| 5,948,872 | 9/1999 | Kioka et al. . |

FOREIGN PATENT DOCUMENTS

| | | |
|---|---|---|
| 839380 | 9/1976 | (BE) . |
| 991798 | 6/1976 | (CA) . |
| 0 197 311 A2 | 10/1986 | (EP) . |
| 0 324 585 A2 | 7/1989 | (EP) . |
| 0 359 444 A1 | 3/1990 | (EP) . |
| 0 417 710 A2 | 3/1991 | (EP) . |
| 0 417 711 A2 | 3/1991 | (EP) . |
| 0 435 514 A2 | 7/1991 | (EP) . |
| 0 452 156 A2 | 10/1991 | (EP) . |
| 0 453 116 A1 | 10/1991 | (EP) . |
| 0 509 294 A2 | 10/1992 | (EP) . |
| 0 630 910 A1 | 12/1994 | (EP) . |
| 0 703 246 A1 | 3/1996 | (EP) . |

OTHER PUBLICATIONS

*Chemical & Engineering News*, 1985, p. 27, vol. 63, Issue 5.
WANG, C., et al., *Organometallics*, 1998, pp. 3149–3151, vol. 17.
SMALL, B.L., et al., *Journal of the American Chemical Society*, 1998, pp. 7143–7144, vol. 120.
SCOLLARD, J.D., et al., *Journal of the American Chemical Society*, 1996, pp. 10008–10009, vol. 118.

* cited by examiner

*Primary Examiner*—Fred Teskin
(74) *Attorney, Agent, or Firm*—Jonathan D. Wood; Bernard J. Graves, Jr.

(57) ABSTRACT

A novel process for producing homopolymers and interpolymers of olefins which involves contacting an olefin and/or an olefin and at least one or more other olefin(s) under polymerization conditions with an olefin polymerization catalyst and at least one ether comprising at least one carbon-oxygen-carbon linkage (C—O—C) of the formula $R^1$—O—($R^2$—O)$_m$—$R^3$ in amounts sufficient to reduce the electrostatic charge in the polymerization medium. Also disclosed is a process for reducing electrostatic charge in an olefin polymerization medium.

42 Claims, No Drawings

PROCESS FOR PRODUCING POLYOLEFINS

CROSS-REFERENCE TO RELATED APPLICATION

This application claims priority under 35 U.S.C. §119(e) to U.S. Provisional Application Ser. No. 60/126,909, filed Mar. 30, 1999.

FIELD OF INVENTION

The present invention relates to a polymerization process for the production of polyolefins utilizing a catalyst suitable for polymerizing olefins and a compound comprising an ether linkage in amounts sufficient to reduce the electrostatic charge in the polymerization reactor. The use of the compound comprising the ether linkage as a catalytic agent further provides polyolefins that are suitable for molding and film applications.

BACKGROUND OF INVENTION

Polyolefins such as polyethylene are well known and are useful in many applications. In particular, linear polyethylene polymers possess properties which distinguish them from other polyethylene polymers, such as branched ethylene homopolymers commonly referred to as LDPE (low density polyethylene). Certain of these properties are described by Anderson et al, U.S. Pat. No. 4,076,698.

A particularly useful polymerization medium for producing polyethylene and polypropylene polymers is a gas phase process. Examples of such are given in U.S. Pat. Nos. 3,709,853; 4,003,712; 4,011,382; 4,302,566; 4,543,399; 4,882,400; 5,352,749 and 5,541,270 and Canadian Patent No. 991,798 and Belgian Patent No. 839,380.

There are known various catalysts for polymerizing olefins. Exemplary of such catalysts are as follow:
1. Chromium oxide catalysts which polymerize ethylene to high molecular weight high density polyethylenes (HDPE) having a broad molecular weight distribution. These catalysts are typically based on Cr(6+) and are supported on a carrier.
2. Organochromium catalysts such as bis(triphenylsilyl) chromate supported on silica and activated with organoaluminum compounds, and bis(cyclopentadienyl) chromium supported on silica.
3. Ziegler-Natta catalysts which typically consist of a transition metal component and an organometallic co-catalyst that is typically an organoaluminum compound.
4. An olefin polymerization catalyst that polymerizes olefins to produce homopolymers and interpolymers of olefins having a molecular weight distribution (MWD) of from 1 to 2.5.
5. Metallocene catalysts which typically consist of a transition metal having at least one substituted or unsubstituted cyclopentadienyl or cyclopentadienyl moiety, and an organometallic co-catalyst that is typically alkyl aluminoxane, such as methyl aluminoxane, or an aryl substituted boron compound.
6. Group 13 catalysts of this type described in U.S. Pat. No. 5,777,120, such as cationic aluminum alkyl amidinate complexes with an organometallic co-catalyst that is typically alkylaluminoxane, such as methylaluminoxane, or an aryl substituted boron compound.
7. Catalysts of the type described in U.S. Pat. No. 5,866,663, such as cationic nickel alkyl diimine complexes with an organometallic co-catalyst that is typically alkylaluminoxane, such as methylaluminoxane, or an aryl substituted boron compound.
8. Catalysts of the type described in Organometallics, 1998, Volume 17, pages 3149–3151, such as neutral nickel alkyl salicylaldiminato complexes.
9. Catalysts of the type described in the Journal of the American Chemical Society, 1998, Volume 120, pages 7143–7144, such as cationic iron alkyl pyridinebisimine complexes with an organometallic co-catalyst that is typically alkylaluminoxane, such as methylaluminoxane, or an aryl substituted boron compound.
10. Catalysts of the type described in the Journal of the American Chemical Society, 1996, Volume 118, pages 10008–10009, such as cationic titanium alkyl diamide complexes with an organometallic co-catalyst that is typically alkylaluminoxane, such as methylaluminoxane, or an aryl substituted boron compound.

The above catalysts are, or can be, supported on inert porous particulate carrier.

A generally encountered problem in polymerization processes, in particular gas phase polymerization processes, is the formation of agglomerates. Agglomerates can form in various places such as the polymerization reactor and the lines for recycling the gaseous stream. As a consequence of agglomerate formation it may be necessary to shut down the reactor.

When agglomerates form within the polymerization reactor there can be many adverse effects. For example, the agglomerates can disrupt the removal of polymer from the polymerization reactor by plugging the polymer discharge system. Further, if the agglomerates fall and cover part of the fluidization grid a loss of fluidization efficiency may occur. This can result in the formation of larger agglomerates which can lead to the loss of the entire fluidized bed. In either case there may be the necessity for the shutdown of the reactor.

It has been found that agglomerates may be formed as a result of the presence of very fine polymer particles in the polymerization medium. These fine polymer particles may be present as a result of introducing fine catalyst particles or breakage of the catalyst within the polymerization medium.

These fine particles are believed to deposit onto and electrostatically adhere to the inner walls of the polymerization reactor and the associated equipment for recycling the gaseous stream such as, for example, the heat exchanger. If the fine particles remain active, and the polymerization reaction continues, then the particles will grow in size resulting in the formation of agglomerates. These agglomerates when formed within the polymerization reactor tend to be in the form of sheets.

Several solutions have been proposed to resolve the problem of formation of agglomerates in gas phase polymerization processes. These solutions include the deactivation of the fine polymer particles, control of the catalyst activity and the reduction of the electrostatic charge. Exemplary of the solutions are as follows.

European Patent Application 0 359 444 A1 describes the introduction into the polymerization reactor of small amounts of an activity retarder in order to keep substantially constant either the polymerization rate or the content of transition metal in the polymer produced. The process is said to produce a polymer without forming agglomerates.

U.S. Pat. No. 4,739,015 describes the use of gaseous oxygen containing compounds or liquid or solid active-hydrogen containing compounds to prevent the adhesion of the polymer to itself or to the inner wall of the polymerization apparatus.

In U.S. Pat. No. 4,803,251 there is described a process for reducing sheeting utilizing a group of chemical additives which generate both positive and negative charges in the reactor, and which are fed to the reactor in an amount of a few parts per million(ppm) per part of the monomer in order to prevent the formation of undesired positive or negative charges.

Other processes and other additives that may be used to neutralize electrostatic charge in the fluidized-bed reactor are found in U.S. Pat. Nos. 4,792,592; 4,803,251; 4,855,370; 4,876,320; 5,162,463; 5,194,526 and 5,200,477.

Additional processes for reducing or eliminating electrostatic charge include (1) installation of grounding devices in a fluidized bed, (2) ionization of gas or particles by electrical discharge to generate ions which neutralize electrostatic charge on the particles and (3) the use of radioactive sources to produce radiation capable of generating ions which neutralize the electrostatic charge on the particles.

It would be desirable therefore to provide a process for producing polyolefins, particularly polyethylene, wherein the problems associated with electrostatic charge are reduced.

SUMMARY OF THE INVENTION

The polymerization process of the present invention comprises the introduction into a polymerization medium comprising an olefin, particularly ethylene, and optionally at least one or more other olefin(s), an olefin polymerization catalyst and at least one compound comprising at least one carbon-oxygen-carbon linkage (C—O—C) of the formula $R^1$—O(—$R^2$—O)$_m$—$R^3$ where m ranges from 0 to 30, and $R^1$, $R^2$ and $R^3$ independently contain from 1 to 30 carbon atoms and from 0 to 30 heteroatoms of an element, or mixtures thereof, selected from Groups 13, 14, 15, 16 and 17 of the Periodic Table of Elements, and further wherein $R^1$, $R^2$ and/or $R^3$ can be linked and form part of a cyclic or polycyclic structure, herein referred to as the ether, wherein the ether is present in an amount sufficient to reduce the electrostatic charge in the polymerization medium to a level lower than would occur in the same polymerization process in the absence of the ether.

The present invention also relates to a process for reducing electrostatic charge in the polymerization of an olefin, particularly ethylene, and optionally at least one or more other olefin(s) in a polymerization medium, particularly gas phase, in the presence of an olefin polymerization catalyst, and at least one ether comprising at least one carbon-oxygen-carbon linkage (C—O—C) of the formula $R^1$—O(—$R^2$—O)$_m$—$R^3$ where m ranges from 0 to 30, and $R^1$, $R^2$ and $R^3$ independently contain from 1 to 30 carbon atoms and from 0 to 30 heteroatoms of an element, or mixtures thereof, selected from Groups 13, 14, 15, 16 and 17 of the Periodic Table of Elements, and further wherein $R^1$, $R^2$ and/or $R^3$ can be linked and form part of a cyclic or polycyclic structure, comprising introducing the ether into the polymerization medium in an amount sufficient to reduce the electrostatic charge in the polymerization medium to a level lower than would occur in the same polymerization process in the absence of the ether.

Optionally a halogenated hydrocarbon may be added to the polymerization medium.

The ether as defined herein and the optional halogenated hydrocarbon may be added to the polymerization medium in any manner. The ether as defined herein and the halogenated hydrocarbon may be added to the olefin polymerization catalyst just prior to addition to the polymerization medium, or added separately from the catalyst to the polymerization medium in any manner known in the art. For example, the ether as defined herein may optionally be premixed with the halogenated hydrocarbon prior to addition to the polymerization medium.

If a gas phase fluidized bed process is utilized for polymerization of the olefin, it may be advantageous to add the ether as defined herein prior to the heat removal means, e.g., the heat exchanger, to slow the rate of fouling of said heat removal means in addition to reducing the electrostatic charge in the polymerization reactor.

All mention herein to elements of Groups of the Periodic Table are made in reference to the Periodic Table of the Elements, as published in "Chemical and Engineering News", 63(5), 27, 1985. In this format, the Groups are numbered 1 to 18.

DETAILED DESCRIPTION OF THE INVENTION

The polymerization process of the present invention comprises the introduction into a polymerization medium comprising an olefin, particularly ethylene, and optionally at least one or more other olefin(s), an olefin polymerization catalyst and at least one compound comprising at least one carbon-oxygen-carbon linkage (C—O—C) of the formula $R^1$—O(—$R^2$—O)$_m$—$R^3$ where m ranges from 0 to 30, and $R^1$, $R^2$ and $R^3$ independently contain from 1 to 30 carbon atoms and from 0 to 30 heteroatoms of an element, or mixtures thereof, selected from Groups 13, 14, 15, 16 and 17 of the Periodic Table of Elements, and further wherein $R^1$, $R^2$ and/or $R^3$ can be linked and form part of a cyclic or polycyclic structure, herein referred to as the ether, wherein the ether is present in an amount sufficient to reduce the electrostatic charge in the polymerization medium to a level lower than would occur in the same polymerization process in the absence of the ether.

The present invention also relates to a process for reducing electrostatic charge in the polymerization of an olefin, particularly ethylene, and optionally at least one or more other olefin(s) in a polymerization medium, particularly gas phase, in the presence of an olefin polymerization catalyst, and at least one ether comprising at least one carbon-oxygen-carbon linkage (C—O—C) of the formula $R^1$—O (—$R^2$—O)$_m$—$R^3$ where m ranges from 0 to 30, and $R^1$, $R^2$ and $R^3$ independently contain from 1 to 30 carbon atoms and from 0 to 30 heteroatoms of an element, or mixtures thereof, selected from Groups 13, 14, 15, 16 and 17 of the Periodic Table of Elements, and further wherein $R^1$, $R^2$ and/or $R^3$ can be linked and form part of a cyclic or polycyclic structure, comprising introducing the ether into the polymerization medium in an amount sufficient to reduce the electrostatic charge in the polymerization medium to a level lower than would occur in the same polymerization process in the absence of the ether.

Optionally a halogenated hydrocarbon may be added to the polymerization medium.

The ether used herein to reduce the electrostatic charge in the polymerization medium is any compound comprising at least one carbon-oxygen-carbon linkage (C—O—C) of the formula $R^1$—O(—$R^2$—O)$_m$—$R^3$ where m ranges from 0 to 30, and $R^1$, $R^2$ and $R^3$ independently contain from 1 to 30 carbon atoms and from 0 to 30 heteroatoms of an element, or mixtures thereof, selected from Groups 13, 14, 15, 16 and 17 of the Periodic Table of Elements, and further wherein $R^1$, $R^2$ and/or $R^3$ can be linked and form part of a cyclic or polycyclic structure.

Exemplary of the $R^1$, $R^2$ and $R^3$ groups suitable for use herein are $C_{1-30}$ alkyl, $C_{2-30}$ alkenyl, $C_{4-30}$ dienyl, $C_{3-30}$ cycloalkyl, $C_{3-30}$ cycloalkenyl, $C_{4-30}$ cyclodienyl, $C_{6-18}$ aryl, $C_{7-30}$ aralkyl and $C_{7-30}$ alkaryl. Also exemplary are hydrocarbons containing from 1 to 30 carbon atoms and from 1 to 30 heteroatoms of an element, or mixtures thereof, from Groups 13, 14, 15, 16 and 17 of the Periodic Table of Elements such as, for example, $B_{1-30}$ borohydrocarbons, $Si_{1-30}$ silahydrocarbons, $P_{1-30}$ phosphahydrocarbons, $S_{1-30}$ thiahydrocarbons, $Cl_{1-30}$ chlorohydrocarbons and halogenated hydrocarbons containing mixtures of halogens.

It is also suitable to utilize herein as the ether to reduce the electrostatic charge, mixtures of compounds having the above formula.

Exemplary of compounds used herein to reduce the electrostatic charge are compounds comprising one C—O—C linkage where m=0, such as alkyl, alkenyl, dienyl and aryl substituted compounds of the formula $R^1$—O—$R^3$. Specific examples are dimethyl ether; diethyl ether; dipropyl ether; diisopropyl ether; dibutyl ether; dipentyl ether; dihexyl ether; dioctyl ether; diisoamyl ether; di-tert-butyl ether; diphenyl ether; dibenzyl ether; divinyl ether; diallyl ether; dicyclopropyl ether; dicyclopentyl ether; dicyclohexyl ether; allyl methyl ether; allyl ethyl ether; allyl cyclohexyl ether; allyl phenyl ether; allyl benzyl ether; allyl 2-tolyl ether; allyl 3-tolyl ether; benzyl methyl ether; benzyl ethyl ether; benzyl isoamyl ether; benzyl chloromethyl ether; benzyl cyclohexyl ether; benzyl phenyl ether; benzyl 1-naphthyl ether; benzyl 2-naphthyl ether; butyl methyl ether; butyl ethyl ether; sec-butyl methyl ether; tert-butyl methyl ether; butyl cyclopentyl ether; butyl 2-chloroethyl ether; cyclopentyl methyl ether; cyclohexyl ethyl ether; cyclohexyl vinyl ether; tert-amyl methyl ether; sec-butyl ethyl ether; tert-butyl ethyl ether; tert-amyl ethyl ether; cyclododecyl methyl ether; bis(3-cyclopenten-1-yl) ether; 1-methoxy-1,3-cyclohexadiene; 1-methoxy-1,4-cyclohexadiene; chloromethyl methyl ether; chloromethyl ethyl ether; bis(2-tolyl) ether; trimethylsilylmethyl methyl ether; bis(trimethylsilylmethyl) ether; bis(2,2,2-trifluoroethyl) ether; benzyl 3-bromopropyl ether; benzyl 3-bromo-2-chloropropyl ether; dimethyl 2-methoxyethyl borate; dimethyl methoxymethyl borate; dimethoxy-2-methoxyethylborane; diphenyl-2-methoxyethylphosphine; diphenylmethoxymethylphosphine; 2-(2-thienyl)ethyl ethyl ether; 2-(2-thienyl)ethyl methyl ether; 2-(3-thienyl)ethyl ethyl ether; 2-(3-thienyl)ethyl methyl ether; 2-(2-methoxymethyl)-1,3,2-dioxaphospholane; 1-(2-methoxyethyl)pyrrole; 1-(2-methoxyethyl)pyrazole; 1-(2-methoxyethyl)imidazole; 2-(2-methoxyethyl)pyridine; bis (3-tolyl) ether; bis(1-naphthyl) ether; bis(2-naphthyl) ether; allyl 1-naphthyl ether; allyl 2-naphthyl ether; benzyl 2-tolyl ether; benzyl 3-tolyl ether; ethyl phenyl ether; ethyl 2-tolyl ether; ethyl 3-tolyl ether; ethyl 1-naphthyl ether; ethyl 2-naphthyl ether; methyl phenyl ether; methyl 2-tolyl ether; methyl 3-tolyl ether; methyl 1-naphthyl ether; methyl 2-naphthyl ether; 2-ethoxy-1-methylpyrrole; 3-methoxy-1-methylpyrrole; 2-ethoxythiophene; 3-methoxythiophene; 3-methoxy-1-methylpyrazole; 4-methoxy-1-methylpyrazole; 5-methoxy-1-methylpyrazole; 2-methoxy-1-methylimidazole; 4-methoxy-1-methylimidazole; 5-methoxy-1-methylimidazole; 3-methoxy-1-phenylpyrazole; 4-methoxy-1-phenylpyrazole; 5-methoxy-1-phenylpyrazole; 2-methoxy-1-phenylimidazole; 4-methoxy-1-phenylimidazole; 5-methoxy-1-phenylimidazole; 4-methoxy-1-methyl-1,2,3-triazole; 5-methoxy-1-methyl-1,2,3-triazole; 4-methoxy-1-phenyl-1,2,3-triazole; 5-methoxy-1-phenyl-1,2,3-triazole; 3-methoxy-1-methyl-1,2,4-triazole; 5-methoxy-1-methyl-1,2,4-triazole; 3-methoxy-1-phenyl-1,2,4-triazole; 5-methoxy-1-phenyl-1,2,4-triazole; 5-methoxy-1-methyltetrazole; 5-methoxy-1-phenyltetrazole; 3-methoxyisoxazole; 4-methoxyisoxazole; 5-methoxyisoxazole; 3-methoxy-1,2,4-oxadiazole; 5-methoxy-1,2,4-oxadiazole; 3-methoxyisothiazole; 4-methoxyisothiazole; 5-methoxyisothiazole; 2-methoxythiazole; 4-methoxythiazole; 5-methoxythiazole; 2-methoxypyridine; 3-methoxypyridine; 4-methoxypyridine; 3-methoxypyridazine; 4-methoxypyridazine; 2-methoxypyrimidine; 4-methoxypyrimidine; 5-methoxypyrimidine; 2-methoxypyrazine; 3-methoxy-1,2,4-triazine; 5-methoxy-1,2,4-triazine; 6-methoxy-1,2,4-triazine; 2-methoxy-1,3,5-triazine and the like. Also exemplary are $C_{2-20}$ cyclic compounds where $R^1$ and $R^3$ are linked and form part of a cyclic or polycyclic structure such as, for example, ethylene oxide; propylene oxide; 1,2-epoxybutane; cyclopentene oxide; epichlorohydrin; trimethylene oxide; 3,3-dimethyloxetane; furan; 2,3-dihydrofuran; 2,5-dihydrofuran; tetrahydrofuran; 2-methyltetrahydrofuran; 2,5-dimethyltetrahydrofuran; 4,5-dihydro-2-methylfuran; 2-methylfuran; 2,5-dimethylfuran; 3-bromofuran; 2,3-benzofuran; 2-methylbenzofuran; dibenzofuran; phthalan; xanthene; 1,2-pyran; 1,4-pyran; tetrahydropyran; 3-methyltetrahydropyran; 4-chlorotetrahydropyran; chroman; isochroman; oxocane; 2,3-epoxybutane; 1,2-epoxybut-3-ene; styrene oxide; 2-ethylfuran; 2-tert-butylfuran; 2,3-dimethylfuran; 2,3-dihydrobenzofuran; dimethyl 3-furylmethyl borate; 2-trimethylsilylfuran; 3-trimethylsilylfuran; oxazole; 1,3,4-oxadiazole; 3,4-dichloro-1,2-epoxybutane; 3,4-dibromo-1, 2-epoxybutane and the like.

Exemplary compounds comprising more than one C—O—C linkage include alkyl, alkenyl, dienyl and aryl substituted compounds of the formula $R^1$—O(—$R^2$—O)$_m$—$R^3$ where m ranges from 1 to 30. Specific examples are, dimethoxymethane; 1,1-dimethoxyethane; 1,1,1-trimethoxyethane; 1,1,2-trimethoxyethane; 1,1-dimethoxypropane; 1,2-dimethoxypropane; 2,2-dimethoxypropane; 1,3-dimethoxypropane; 1,1,3-trimethoxypropane; 1,4-dimethoxybutane; 1,2-dimethoxybenzene; 1,3-dimethoxybenzene; 1,4-dimethoxybenzene; ethylene glycol dimethyl ether; ethylene glycol diethyl ether; ethylene glycol divinyl ether; ethylene glycol diphenyl ether; ethylene glycol tert-butyl methyl ether; ethylene glycol tert-butyl ethyl ether; di(ethylene glycol)dimethyl ether; di(ethylene glycol) diethyl ether; di(ethylene glycol)dibutyl ether; di(ethylene glycol) tert-butyl methyl ether; tri(ethylene glycol)dimethyl ether; tri (ethylene glycol)diethyl ether; tetra(ethylene glycol) dimethyl ether; tetra(ethylene glycol) diethyl ether; ethylene glycol bis(trimethylsilylmethyl)ether; di(ethylene glycol) methyl trimethylsilyl ether; tris(2-methoxyethyl)borate; ethylene glycol chloromethyl bromomethyl ether; 2-(2-ethylhexyl)-1,3-dimethoxypropane; 2-isopropyl-1,3-dimethoxypropane; 2-butyl-1,3-dimethoxypropane; 2-sec-butyl-1,3-dimethoxypropane; 2-tert-butyl-1,3-dimethoxypropane; 2-cyclohexyl-1,3-dimethoxypropane; 2-phenyl-1,3-dimethoxypropane; 2-cumyl-1,3-dimethoxypropane; 2-(2-phenylethyl)-1,3-dimethoxypropane; 2-(2-cyclohexylethyl)-1,3-dimethoxypropane; 2-(p-chlorophenyl)-1,3-dimethoxypropane; 2-(p-fluorophenyl)-1,3-dimethoxypropane; 2-(diphenylmethyl)-1,3-dimethoxypropane; 2,2-dicyclohexyl-1,3-dimethoxypropane; 2,2-diethyl-1,3-dimethoxypropane; 2,2-dipropyl-1,3-dimethoxypropane; 2,2-diisopropyl-1,3-dimethoxypropane; 2,2-dibutyl-1,3-dimethoxypropane; 2,2- diisobutyl-1,3-dimethoxypropane; 2-methyl-2-ethyl-1,3-dimethoxypropane; 2-methyl-2-propyl-1,3-dimethoxypropane; 2-methyl-2-butyl-1,3-dimethoxypropane; 2-methyl-2-benzyl-1,3-dimethoxypropane; 2-methyl-2-methylcyclohexyl-1,3-dimethoxypropane; 2-isopropyl-2-isopentyl-1,3-dimethoxypropane; 2,2-bis(2-cyclohexylmethyl)-1,3-dimethoxypropane and the like. Also exemplary are $C_{3-20}$ cyclic compounds where $R^1$, $R^2$ and/or $R^3$ are linked and form part of a cyclic or polycyclic structure. Specific examples are 2,5-dimethoxyfuran; 2-methoxyfuran; 3-methoxyfuran; 2-methoxytetrahydropyran; 3-methoxytetrahydropyran; 1,3-dioxolane; 2-methyl-1,3-dioxolane; 2,2-dimethyl-1,3-dioxolane; 2-ethyl-2-methyl-1,3-dioxolane; 2,2-tetramethylene-1,3-dioxolane; 2,2-pentamethylene-1,3-dioxolane; 2-vinyl-1,3-dioxolane; 2-chloromethyl-1,3-dioxolane; 2-methoxy-1,3-dioxolane; 1,4-dioxaspiro[4.4]non-6-ene; 1,4,9,12-tetraoxadispiro (4.2.4.2)tetradecane; 1,3-dioxane; 1,4-dioxane; 4-methyl-1,3-dioxane; 1,3,5-trioxane; 2,4,8,10-tetraoxaspiro(5.5) undecane; 12-crown-4; 15-crown-5; cis-4,7-dihydro-1,3-dioxepin; 1,7-dioxaspiro(5.5)undecane; 3,4-epoxytetrahydrofuran; 2,2-dimethyl-4-vinyl-1,3-dioxolane; tri-2-furylphosphine; 2-trimethylsilyl-1,3-dioxolane; 2-(3-thienyl)-1,3-dioxolane; 2-bromochloromethyl-1,3-dioxolane; 2-methoxyoxazole; 4-methoxyoxazole; 5-methoxyoxazole; 2-methoxy-1,3,4-oxadiazole and the like.

Preferred for use herein as compounds to reduce the electrostatic charge are dimethyl ether; diethyl ether; dipropyl ether; diisopropyl ether; dibutyl ether; diisoamyl ether; di-tert-butyl ether; diphenyl ether; dibenzyl ether; divinyl ether; butyl methyl ether; butyl ethyl ether; sec-butyl methyl ether; tert-butyl methyl ether; cyclopentyl methyl ether; cyclohexyl ethyl ether; tert-amyl methyl ether; sec-butyl ethyl ether; chloromethyl methyl ether; trimethylsilylmethyl methyl ether; bis(trimethylsilylmethyl)ether; bis(2,2,2-trifluoroethyl) ether; methyl phenyl ether; ethylene oxide; propylene oxide; 1,2-epoxybutane; cyclopentene oxide; epichlorohydrin; furan; 2,3-dihydrofuran; 2,5-dihydrofuran; tetrahydrofuran; 2-methyltetrahydrofuran; 2,5-dimethyltetrahydrofuran; 2-methylfuran; 2,5-dimethylfuran; tetrahydropyran; 1,2-epoxybut-3-ene; styrene oxide; 2-ethylfuran; oxazole; 1,3,4-oxadiazole; 3,4-dichloro-1,2-epoxybutane; 3,4-dibromo-1,2-epoxybutane; dimethoxymethane; 1,1-dimethoxyethane; 1,1,1-trimethoxymethane; 1,1,1-trimethoxyethane; 1,1,2-trimethoxyethane; 1,1-dimethoxypropane; 1,2-dimethoxypropane; 2,2-dimethoxypropane; 1,3-dimethoxypropane; 1,1,3-trimethoxypropane; 1,4-dimethoxybutane; 1,2-dimethoxybenzene; 1,3-dimethoxybenzene; 1,4-dimethoxybenzene; ethylene glycol dimethyl ether; di(ethylene glycol) dimethyl ether; di(ethylene glycol)diethyl ether; di(ethylene glycol) dibutyl ether; di(ethylene glycol)tert-butyl methyl ether; tri(ethylene glycol) dimethyl ether; tri(ethylene glycol)diethyl ether; tetra(ethylene glycol) dimethyl ether; 2,2-diethyl-1,3-dimethoxypropane; 2-methyl-2-ethyl-1,3-dimethoxypropane; 2-methoxyfuran; 3-methoxyfuran; 1,3-dioxolane; 2-methyl-1,3-dioxolane; 2,2-dimethyl-1,3-dioxolane; 2-ethyl-2-methyl-1,3-dioxolane; 2,2-tetramethylene-1,3-dioxolane; 2,2-pentamethylene-1,3-dioxolane; 1,3-dioxane; 1,4-dioxane; 4-methyl-1,3-dioxane; 1,3,5-trioxane and 3,4-epoxytetrahydrofuran.

Most preferred for use herein as compounds to reduce the electrostatic charge are tetrahydrofuran, diethyl ether, dipropyl ether, diisopropyl ether, dibutyl ether, dioctyl ether, tert-butyl methyl ether, trimethylene oxide and tetrahydropyran.

Any halogenated hydrocarbon may be used in the process of the present invention. If desired more than one halogenated hydrocarbon can be used. Typical of such halogenated hydrocarbons are monohalogen and polyhalogen substituted saturated or unsaturated aliphatic, alicyclic, or aromatic hydrocarbons having 1 to 12 carbon atoms. Preferred for use in the process of the present invention are dichloromethane, chloroform, carbon tetrachloride, chlorofluoromethane, chlorodifluromethane, dichlorodifluoromethane, fluorodichloromethane, chlorotrifluoromethane, fluorotrichloromethane and 1,2-dichloroethane. Most preferred for use in the process of the present invention is chloroform.

In the present invention, any catalyst for polymerizing olefins may be used. Preferably the olefin polymerization catalyst comprises at least one metal selected from Groups 3, 4, 5, 6, 7, 8, 9, 10, 11, 12 and 13 of the Periodic Table of the Elements, as defined herein. Exemplary metals are titanium, zirconium, vanadium, iron, chromium, nickel and aluminum. The olefin polymerization catalyst may be neutral or cationic.

Exemplary of such polymerization catalysts are:

1. Any compound containing a Group 6 element. Preferred are chromium containing compounds. Exemplary are chromium oxide catalysts which polymerize ethylene to high molecular weight high density polyethylenes (HDPE) having a broad molecular weight distribution. These catalysts are typically based on Cr(6+) and are supported on a carrier. Further exemplary are organochromium catalysts such as bis(triphenylsilyl)chromate supported on silica and activated with organoaluminum compounds, and bis(cyclopentadienyl)chromium supported on silica.

2. Ziegler-Natta catalysts which typically consist of a transition metal component and an organometallic co-catalyst that is typically an organoaluminum compound.

3. An olefin polymerization catalyst that polymerizes olefins to produce interpolymers of olefins having a molecular weight distribution (MWD) of from 1 to 2.5.

4. Metallocene catalysts which consist of a transition metal component having at least one moiety selected from substituted or unsubstituted cyclopentadienyl, substituted or unsubstituted pentadienyl, substituted or unsubstituted pyrrole, substituted or unsubstituted phosphole, substituted or unsubstituted arsole, substituted or unsubstituted boratabenzene, and substituted or unsubstituted carborane, and an organometallic co-catalyst that is typically alkyl aluminoxane, such as methyl aluminoxane, or an aryl substituted boron compound.

5. Any compound containing a Group 13 element. Preferred are aluminum containing compounds. Exemplary are catalysts of the type described in U.S. Pat. No. 5,777,120, such as cationic aluminum alkyl amidinate complexes with an organometallic co-catalyst that is typically alkylaluminoxane, such as methylaluminoxane, or an aryl substituted boron containing compound.

6. Any compound containing a Group 10 element. Preferred are nickel containing compounds. Exemplary are catalysts of the type described in U.S. Pat. No. 5,866,663, such as cationic nickel alkyl diimine complexes with an organometallic co-catalyst that is typically alkylaluminoxane, such as methylaluminoxane, or an aryl substituted boron containing compound. Further exemplary are catalysts of the type described in Organometallics, 1998, Volume 17, pages 3149–3151, such as neutral nickel alkyl salicylaldiminato complexes.

7. Any compound containing a Group 8 element. Preferred are iron containing compounds. Exemplary are catalysts of the type described in the Journal of the American Chemical Society, 1998, Volume 120, pages 7143–7144, such as cationic iron alkyl pyridinebisimine complexes with an organometallic co-catalyst that is typically alkylaluminoxane, such as methylaluminoxane, or an aryl substituted boron containing compound.

8. Any compound containing a Group 4 element. Preferred are titanium and zirconium containing compounds. Exemplary are catalysts of the type described in the Journal of the American Chemical Society, 1996, Volume 118, pages 10008–10009, such as cationic titanium alkyl diamide complexes with an organometallic co-catalyst that is typically alkylaluminoxane, such as methylaluminoxane, or an aryl substituted boron containing compound.

The above catalysts are, or can be, supported on inert porous particulate carriers.

The above olefin polymerization catalysts can be introduced in the process of the present invention in any manner. For example, the catalyst component(s) can be introduced directly into the polymerization medium in the form of a solution, a slurry or a dry free flowing powder. The catalyst if requiring a co-catalyst can be premixed to form an activated catalyst prior to addition to the polymerization medium, or the components can be added separately to the polymerization medium, or the components can be premixed and then contacted with one or more olefins to form a prepolymer and then added to the polymerization medium in prepolymer form. When the catalyst components are premixed prior to introduction into the reactor, any electron donor compound may be added to the catalyst to control the level of activity of the catalyst. Furthermore during the polymerization reaction being carried out in the presence of the olefin polymerization catalyst, as above described, there may be added additional organometallic compound(s). The additional organometallic compounds may be the same or different from that used as co-catalyst.

Any or all of the components of the olefin polymerization catalysts can be supported on a carrier. The carrier can be any particulate organic or inorganic material. Preferably the carrier particle size should not be larger than about 200 microns in diameter. The most preferred particle size of the carrier material can be easily established by experiment. Preferably, the carrier should have an average particle size of 5 to 200 microns in diameter, more preferably 10 to 150 microns and most preferably 20 to 100 microns.

Examples of suitable inorganic carriers include metal oxides, metal hydroxides, metal halogenides or other metal salts, such as sulphates, carbonates, phosphates, nitrates and silicates. Exemplary of inorganic carriers suitable for use herein are compounds of metals from Groups 1 and 2 of the Periodic Table of the Elements, such as salts of sodium or potassium and oxides or salts of magnesium or calcium, for instance the chlorides, sulphates, carbonates, phosphates or silicates of sodium, potassium, magnesium or calcium and the oxides or hydroxides of, for instance, magnesium or calcium. Also suitable for use are inorganic oxides such as silica, titania, alumina, zirconia, chromia, boron oxide, silanized silica, silica hydrogels, silica xerogels, silica aerogels, and mixed oxides such as talcs, silica/chromia, silica/chromia/titania, silica/alumina, silica/titania, silica/magnesia, silica/magnesia/titania, aluminum phosphate gels, silica co-gels and the like. The inorganic oxides may contain small amounts of carbonates, nitrates, sulfates and oxides such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$. Carriers containing at least one component selected from the group consisting of $SiO_2$, $Al_2O_3$ or mixtures thereof as a main component are preferred.

Examples of suitable organic carriers include polymers such as, for example, polyethylene, polypropylene, interpolymers of ethylene and alpha-olefins, polystyrene, and functionalized polystyrene.

The Ziegler-Natta catalysts utilized herein are well known in the industry. The Ziegler-Natta catalysts in the simplest form are comprised of a component comprising at least one transition metal and a co-catalyst comprising at least one organometallic compound. The metal of the transition metal component is a metal selected from Groups 4, 5, 6, 7, 8, 9 and/or 10 of the Periodic Table of the Elements, as published in "Chemical and Engineering News", 63(5), 27, 1985. In this format, the groups are numbered 1–18. Exemplary of such transition metals are titanium, zirconium, vanadium, chromium, manganese, iron, cobalt, nickel, and the like, and mixtures thereof. In a preferred embodiment the transition metal is selected from the group consisting of titanium, zirconium, vanadium and chromium, and in a still further preferred embodiment, the transition metal is titanium. The Ziegler-Natta catalyst can optionally contain magnesium and/or chlorine. Such magnesium and chlorine containing catalysts may be prepared by any manner known in the art.

The co-catalyst used in the process of the present invention can be any organometallic compound, or mixtures thereof, that can activate the transition metal component in a Ziegler-Natta catalyst in the polymerization of olefins. In particular, the organometallic co-catalyst compound that is reacted with the transition metal component contains a metal selected from Groups 1, 2, 11, 12, 13 and/or 14 of the above described Periodic Table of the Elements. Exemplary of such metals are lithium, magnesium, copper, zinc, boron, silicon and the like, or mixtures thereof.

Typically the co-catalyst is an organoaluminum compound such as, for example, trimethylaluminum and triethylaluminum.

Furthermore there may be added to the Ziegler-Natta catalysts any internal electron donor. The internal electron donor compound preferably is selected from the group consisting of ethers, thioethers, esters, thioesters, amines, amides, ketones, nitriles, phosphines, silanes, acid anhydrides, acid halides, acid amides, aldehydes, and organic acid derivatives. More preferred as internal electron donors are compounds containing from 1 to 50 carbon atoms and from 1 to 30 heteroatoms of an element, or mixtures thereof, selected from Groups 14, 15, 16 and 17 of the Periodic Table of Elements.

The Ziegler-Natta catalyst may be prepared by any method known in the art. The catalyst can be in the form of a solution, a slurry or a dry free flowing powder. The amount of Ziegler-Natta catalyst used is that which is sufficient to allow production of the desired amount of the polyolefin.

Metallocene catalysts are well known in the industry and are typically comprised of a transition metal component and a co-catalyst. The transition metal component has at least one moiety selected from substituted or unsubstituted cyclopentadienyl, substituted or unsubstituted pentadienyl, substituted or unsubstituted pyrrole, substituted or unsubstituted phosphole, substituted or unsubstituted arsole, substituted or unsubstituted boratabenzene, and substituted or unsubstituted carborane. The transition metal is selected from Groups 3, 4, 5, 6, 7, 8, 9 and 10 of the Periodic Table of the Elements. Exemplary of such transition metals are titanium, zirconium, hafnium, vanadium, chromium, manganese, iron, cobalt, nickel, and the like, and mixtures thereof. In a preferred embodiment the transition metal is selected from Groups 4, 5 or 6 such as, for example, titanium, zirconium, hafnium, vanadium and chromium, and in a still further preferred embodiment, the transition metal is titanium or zirconium or mixtures thereof.

The co-catalyst component of the metallocene catalyst can be any compound, or mixtures thereof, that can activate the transition metal component of the metallocene catalyst in olefin polymerization. Typically the co-catalyst is an alkylaluminoxane such as, for example, methylaluminoxane (MAO) and aryl substituted boron compounds such as, for example, tris(perfluorophenyl)borane and the salts of tetrakis(perfluorophenyl)borate.

There are many references describing metallocene catalysts in great detail. For example, metallocene catalyst are described in U.S. Pat. Nos. 4,564,647; 4,752,597; 5,106,804; 5,132,380; 5,227,440; 5,296,565; 5,324,800; 5,331,071; 5,332,706; 5,350,723; 5,399,635; 5,466,766; 5,468,702; 5,474,962; 5,578,537 and 5,863,853.

In carrying out the polymerization process of the present invention, the co-catalyst(s), if utilized, is added to the polymerization medium in any amount sufficient to effect production of the desired polyolefin. It is preferred to utilize the co-catalyst(s) in a molar ratio of co-catalyst(s) to metal component(s) of the olefin polymerization catalyst ranging from about 0.5:1 to about 10000:1. In a more preferred embodiment, the molar ratio of co-catalyst(s) to metal component(s) ranges from about 0.5:1 to about 1000:1.

The polymerization process of the present invention may be carried out using any suitable process, for example, solution, slurry and gas phase. A particularly desirable method for producing polyolefin polymers according to the present invention is a gas phase polymerization process preferably utilizing a fluidized bed reactor. This type reactor and means for operating the reactor are well known and completely described in U.S. Pat. Nos. 3,709,853; 4,003,712; 4,011,382; 4,012,573; 4,302,566; 4,543,399; 4,882,400; 5,352,749; 5,541,270; Canadian Patent No. 991,798 and Belgian Patent No. 839,380. These patents disclose gas phase polymerization processes wherein the polymerization medium is either mechanically agitated or fluidized by the continuous flow of the gaseous monomer and diluent. The entire contents of these patents are incorporated herein by reference.

In general, the polymerization process of the present invention may be effected as a continuous gas phase process such as a fluid bed process. A fluid bed reactor for use in the process of the present invention typically comprises a reaction zone and a so-called velocity reduction zone. The reaction zone comprises a bed of growing polymer particles, formed polymer particles and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

In more detail, the reactor temperature of the fluid bed process herein ranges from about 30° C. to about 150° C. In general, the reactor temperature is operated at the highest temperature that is feasible taking into account the sintering temperature of the polymer product within the reactor.

The process of the present invention is suitable for the production of homopolymers of olefins, particularly ethylene, and/or copolymers, terpolymers, and the like, of olefins, particularly ethylene, and at least one or more other olefin(s). Preferably the olefins are alpha-olefins. The olefins, for example, may contain from 2 to 16 carbon atoms. Particularly preferred for preparation herein by the process of the present invention are polyethylenes. Such polyethylenes are preferably homopolymers of ethylene and interpolymers of ethylene and at least one alpha-olefin wherein the ethylene content is at least about 50% by weight of the total monomers involved. Exemplary olefins that may be utilized herein are ethylene, propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

In carrying out the polymerization process of the present invention the ether used to reduce the electrostatic charge in the polymerization medium is added in any manner. For example, the ether may be added to the preformed catalyst, to the prepolymer during the prepolymerization step, to the preformed prepolymer and/or to the polymerization medium. The ether may optionally be premixed with the co-catalyst when utilized. The ether is added in any amount sufficient to reduce the electrostatic charge in the polymerization medium to a level lower than would occur in the same polymerization process in the absence of the ether. It is preferred to incorporate the ether in a molar ratio of compound to metal component of the olefin polymerization catalyst ranging from about 0.001:1 to about 100:1. In a more preferred embodiment, the molar ratio of the ether to metal component ranges from about 0.01:1 to about 50:1.

In carrying out the polymerization process of the present invention, the halogenated hydrocarbon may be added to the polymerization medium in any amount sufficient to effect production of the desired polyolefin. It is preferred to incorporate the halogenated hydrocarbon in a molar ratio of halogenated hydrocarbon to metal component of the olefin polymerization catalyst ranging from about 0.001:1 to about 100:1. In a more preferred embodiment, the molar ratio of halogenated hydrocarbon to metal component ranges from about 0.001:1 to about 10:1.

The molecular weight of the polyolefin produced by the present invention can be controlled in any known manner, for example, by using hydrogen. The molecular weight control of polyethylene, for example, may be evidenced by an increase in the melt index ($I_2$) of the polymer when the molar ratio of hydrogen to ethylene in the polymerization medium is increased.

Molecular weight distribution (MWD), or polydispersity, is a well known characteristic of polymers. MWD is generally described as the ratio of the weight average molecular weight (Mw) to the number average molecular weight (Mn). The ratio Mw/Mn can be measured directly by gel permeation chromatography techniques. The MWD of a polymer is determined with a Waters Gel Permeation Chromatograph Series 150C equipped with Ultrastyrogel columns and a refractive index detector. In this development, the operating temperature of the instrument was set at 140° C., the eluting solvent was o-dichlorobenzene, and the calibration standards included 10 polystyrenes of precisely known molecular weight, ranging from a molecular weight of 1000 to a molecular weight of 1.3 million, and a polyethylene standard, NBS 1475.

Any conventional additive may be added to the polyolefins obtained by the present invention. Examples of the additives include nucleating agents, heat stabilizers, antioxidants of phenol type, sulfur type and phosphorus type, lubricants, antistatic agents, dispersants, copper harm inhibitors, neutralizing agents, foaming agents, plasticizers, anti-foaming agents, flame retardants, crosslinking agents, flowability improvers such as peroxides, ultraviolet light absorbers, light stabilizers, weathering stabilizers, weld strength improvers, slip agents, anti-blocking agents, anti-fogging agents, dyes, pigments, natural oils, synthetic oils, waxes, fillers and rubber ingredients.

The polyolefins, particularly polyethylenes, of the present invention may be fabricated into films by any technique known in the art. For example, films may be produced by the well known cast film, blown film and extrusion coating techniques.

Further, the polyolefins, particularly polyethylenes, may be fabricated into other articles of manufacture, such as molded articles, by any of the well known techniques.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way. All U.S. Patents referred to herein are incorporated by reference in their entirety.

EXAMPLES

In the following examples the test procedures listed below were used in evaluating the analytical properties of the polyolefins herein.

a) Density is determined according to ASTM D-4883 from a plaque made according to ASTM D1928;

b) Melt Index (MI), $I_2$, is determined in accord with ASTM D-1238, condition E, measured at 190° C., and reported as decigrams per minute;

c) Residual Titanium Content in the Product. The residual titanium content in the product is measured by X-Ray Fluorescence Spectroscopy (XRF) using a Philips Sequential X-Ray Spectrometer Model PW 1480. The samples of the polymer to be evaluated were compression molded into a circular shaped plaque approximately 43 mm in diameter so as to fit the sample holder on the spectrometer and 3 to 5 mm in thickness and having a smooth flat surface. The molded test specimens were then placed in the XRF unit and the x-ray fluorescence arising from the titanium in the test specimen was measured. The residual titanium content was then determined based on a calibration curve obtained by measurements from polyethylene calibration specimens containing a known amount of titanium. The residual titanium content is reported as parts per million (ppm) relative to the polymer matrix.

Olefin Polymerization Catalysts Utilized in the Examples

The Ziegler-Natta catalyst used in Examples 1, 2 and 3 was prepared in accordance with Example 1-a of European Patent Application EP 0 703 246 A1. The catalyst was used in prepolymer form and was prepared in accordance with Example 1-b of European Patent Application EP 0 703 246 A1. A prepolymer containing about 34 grams of polyethylene per millimole of titanium was thus obtained. This catalyst is herein referred to as Catalyst I.

The Ziegler-Natta catalyst used in Examples 4 and 5 was obtained from Toho Titanium Company, Limited under the product name THC-C. The catalyst was a titanium-based catalyst supported on magnesium chloride. This catalyst is herein referred to as Catalyst II.

The Ziegler-Natta catalyst used in Example 6 was obtained from Grace Davison, Baltimore, Md. under the product name XPO-5021. The catalyst was a titanium-based catalyst supported on silica. This catalyst is herein referred to as Catalyst III.

Polymerization Process

The polymerization process utilized in Examples 1–6 herein was carried out in a fluidized-bed reactor for gas-phase polymerization, consisting of a vertical cylinder of diameter 0.74 meters and height 7 meters and surmounted by a velocity reduction chamber. The reactor is provided in its lower part with a fluidization grid and with an external line for recycling gas, which connects the top of the velocity reduction chamber to the lower part of the reactor, at a point below the fluidization grid. The recycling line is equipped with a compressor for circulating gas and a heat transfer means such as a heat exchanger. In particular the lines for supplying ethylene, an olefin such as 1-butene, 1-pentene and 1-hexene, hydrogen and nitrogen, which represent the main constituents of the gaseous reaction mixture passing through the fluidized bed, feed into the recycling line. Above the fluidization grid, the reactor contains a fluidized bed consisting of a polyethylene powder made up of particles with a weight-average diameter of about 0.5 mm to about 1.4 mm. The gaseous reaction mixture, which contains ethylene, olefin comonomer, hydrogen, nitrogen and minor amounts of other components, passes through the fluidized bed under a pressure ranging from about 280 psig to about 300 psig with an ascending fluidization speed, referred to herein as fluidization velocity, ranging from about 1.6 feet per second to about 2.0 feet per second.

In Examples 1–3 the Ziegler-Natta catalyst, Catalyst I, as described above in prepolymer form, was introduced intermittently into the reactor. The said catalyst contained magnesium, chlorine and titanium. The prepolymer form contained about 34 grams of polyethylene per millimole of titanium and an amount of tri-n-octylaluminum (TnOA) such that the molar ratio, Al/Ti, ranged from 0.9:1 to about 1.0:1. In Examples 4 and 5 the Ziegler-Natta catalyst, Catalyst II, supplied by Toho Titanium Company, Limited was introduced directly into the reactor without having been formed into a prepolymer. In Example 6 the Ziegler-Natta catalyst, Catalyst III, supplied by Grace Davison was introduced directly into the reactor without having been formed into a prepolymer. The rate of introduction of the prepolymer or catalyst into the reactor was adjusted for each given set of conditions in achieving the desired production rate. During the polymerization the co-catalyst was introduced continuously into the line for recycling the gaseous reaction mixture, at a point situated downstream of the heat transfer means. The feed rate of co-catalyst is expressed as a molar ratio of trialkylaluminum to titanium (Al/Ti), and is defined as the ratio of the co-catalyst feed rate (in moles of trialkylaluminum per hour) to the catalyst or prepolymer feed rate (in moles of titanium per hour). Optionally, a solution of chloroform ($CHCl_3$) in n-hexane, at a concentration of about 0.5 weight percent, was introduced continuously into the line for recycling the gaseous reaction mixture. The feed rate of the halogenated hydrocarbon is expressed as a molar ratio of $CHCl_3$ to titanium ($CHCl_3/Ti$), and is defined as the ratio of the $CHCl_3$ feed rate (in moles of $CHCl_3$ per hour) to the catalyst or prepolymer feed rate (in moles of titanium per hour).

Tetrahydrofuran (THF), when utilized in the following examples, was the ether used to reduce the electrostatic charge in the polymerization medium. A solution of THF in n-hexane, at a concentration of about 1 weight percent, can be introduced continuously into the line for recycling the gaseous reaction mixture. The feed rate of THF is expressed as a molar ratio of THF to titanium (THF/Ti), and is defined as the ratio of the THF feed rate (in moles of THF per hour) to the catalyst or prepolymer feed rate (in moles of titanium per hour).

The electrostatic charge of the fluidized bed was measured by a Correflow Model 3400 Electrostatic Monitor (ESM) supplied by Auburn International, Inc. of Danvers, Mass. The electrostatic probe was installed in the vertical cylindrical section of the reactor at a height such as to be within the fluidized bed of polymer particles. The electrostatic probe measures the current flow between the polymerization medium and the ground. A reduction in electrostatic charge is defined as a reduction in the absolute magnitude of the measured current and/or a reduction in the variability of the measured current.

Example 1

Comparative

Preparation of an Ethylene/1-Hexene Interpolymer with Catalyst I without the Addition of an Ether to Reduce the Electrostatic Charge The process conditions and resin properties are given in Table 1. The molar ratio of $CHCl_3$ to titanium was 0.03. The process was conducted without the addition of an ether to reduce the electrostatic charge. 1-Hexene was used as comonomer. Under these conditions a polyethylene free from agglomerate was withdrawn from the reactor at a rate of 210 lb/h (pounds per hour). The ethylene/1-hexene interpolymer had a density of 0.918 g/cc, a melt index $MI_{2.16}$, $I_2$, of 0.9 dg/min and a residual titanium level of 10.5 ppm.

The level of electrostatic charge in the fluidized bed was measured as described above.

Example 2

Preparation of an Ethylene/1-Hexene Interpolymer with Catalyst I with Addition of an Ether to Reduce the Electrostatic Charge The process conditions and resin properties are given in Table 1. The molar ratio of trimethylaluminum (TMA) to titanium was 6:1. The molar ratio of $CHCl_3$ to titanium was 0.04:1. The process was conducted with the addition of THF as the ether to reduce the electrostatic charge. The molar ratio of THF to titanium was 3:1. 1-Hexene was used as comonomer. Under these conditions a polyethylene free from agglomerate was withdrawn from the reactor at a rate of 221 lb/h. The ethylene/1-hexene interpolymer had a density of 0.917 g/cc, a melt index $MI_{2.16}$, $I_2$, of 0.9 dg/min and a residual titanium level of 5.2 ppm.

The level of electrostatic charge in the fluidized bed was measured as described above. It was found that the addition of THF reduced the level of electrostatic charge in the fluidized bed as compared to the level measured in Example 1.

Example 3

Preparation of an Ethylene/1-Hexene Interpolymer with Catalyst I with Addition of an Ether to Reduce the Electrostatic Charge The process conditions and resin properties are given in Table 1. The molar ratio of trimethylaluminum (TMA) to titanium was 6:1. The molar ratio of $CHCl_3$ to titanium was 0.05:1. The process was conducted with the addition of THF as the ether to reduce the electrostatic charge. The molar ratio of THF to titanium was 7:1. 1-Hexene was used as comonomer. Under these conditions a polyethylene free from agglomerate was withdrawn from the reactor at a rate of 205 lb/h. The ethylene/1-hexene interpolymer had a density of 0.918 g/cc, a melt index $MI_{2.16}$, $I_2$, of 1.0 dg/min and a residual titanium level of 14.1 ppm.

The level of electrostatic charge in the fluidized bed was measured as described above. It was found that the addition of a larger quantity of THF than was present in Example 2 reduced the level of electrostatic charge as compared to the level measured in Example 2.

Example 4

Comparative

Preparation of an Ethylene/1-Hexene Interpolymer with Catalyst II without the Addition of a Compound to Reduce the Electrostatic Charge The process conditions and resin properties are given in Table 1. The molar ratio of trimethylaluminum (TMA) to titanium was 30:1. The process was conducted without the addition of an ether to reduce the electrostatic charge. 1-Hexene was used as comonomer. Under these conditions a polyethylene free from agglomerate was withdrawn from the reactor at a rate of 229 lb/h. The ethylene/1-hexene interpolymer had a density of 0.918 g/cc, a melt index $MI_{2.16}$, $I_2$, of 0.9 dg/min and a residual titanium level of 0.8 ppm.

The level of electrostatic charge in the fluidized bed was measured as described above.

Example 5

Preparation of an Ethylene/1-Hexene Interpolymer with Catalyst II with Addition of an Ether to Reduce the Electrostatic Charge The process conditions and resin properties are given in Table 1. The molar ratio of trimethylaluminum (TMA) to titanium was 19:1. The molar ratio of $CHCl_3$ to titanium was 0.06:1. The process was conducted with the addition of THF as the ether to reduce the electrostatic charge. The molar ratio of THF to titanium was 2.5:1. 1-Hexene was used as comonomer. Under these conditions a polyethylene free from agglomerate was withdrawn from the reactor at a rate of 201 lb/h. The polyethylene had a density of 0.918 g/cc, a melt index $MI_{2.16}$, $I_2$, of 0.8 dg/min and a residual titanium level of 1.1 ppm.

The level of electrostatic charge in the fluidized bed was measured as described above. It was found that the addition of THF reduced the level of electrostatic charge in the fluidized bed as compared to the level measured in Example 4.

TABLE 1

Reactor Conditions and Resin Properties for Examples 1 through 5

| | Example | | | | |
|---|---|---|---|---|---|
| | 1 | 2 | 3 | 4 | 5 |
| Reactor Pressure (psig) | 287 | 284 | 287 | 295 | 294 |
| Reactor Temperature (° C.) | 86 | 86 | 86 | 85 | 85 |
| Fluidization Velocity (ft/sec) | 1.75 | 1.63 | 1.71 | 1.78 | 1.85 |
| Fluidized Bulk Density (lb/ft$^3$) | 16.0 | 17.6 | 17.6 | 17.1 | 18.1 |
| Reactor Bed Height (ft) | 11 | 16 | 16 | 10 | 10 |
| Ethylene ($C_2$) (mole %) | 39.4 | 29.3 | 29.0 | 27.7 | 25.2 |
| $H_2/C_2$ (molar ratio) | 0.163 | 0.129 | 0.162 | 0.210 | 0.283 |
| 1-Hexene/$C_2$ (molar ratio) | 0.135 | 0.154 | 0.173 | 0.175 | 0.193 |
| Catalyst Number | I | I | I | II | II |
| Co-catalyst | — | TMA | TMA | TMA | TMA |
| Al/Ti (molar ratio) | 0 | 6 | 6 | 30 | 19 |
| The Ether | — | THF | THF | — | THF |
| THF/Ti (molar ratio) | 0 | 3 | 7 | 0 | 2.5 |
| $CHCl_3$/Ti | 0.03 | 0.04 | 0.05 | 0 | 0.06 |
| Production Rate (lb/h) | 210 | 221 | 205 | 229 | 201 |
| Space Time Yield (kg/h-m$^3$) | 67.4 | 48.0 | 45.1 | 78.3 | 72.8 |
| Residual Titanium (ppm) | 10.5 | 5.2 | 14.1 | 0.8 | 1.1 |
| Density (g/cc) | 0.918 | 0.917 | 0.918 | 0.918 | 0.918 |
| Melt Index, $I_2$, (dg/min) | 0.9 | 0.9 | 1.0 | 0.9 | 0.8 |

Example 6
Preparation of an Ethylene/1-Hexene Interpolymer with Catalyst III with and without the Addition of an Ether to Reduce the Electrostatic Charge In this example a comparison was made with and without the addition of tetrahydrofuran (THF) to illustrate the effect on the electrostatic charge in the polymerization medium for a process for polymerizing olefins. The olefins were ethylene and 1-hexene. The molar ratio of triethylaluminum (TEAL) to titanium was 31:1. In carrying out the example the polymerization conditions were as follows:

| | |
|---|---|
| Reactor Pressure | 295 psig |
| Reactor Temperature | 83° C. |
| Fluidization Velocity | 1.94 ft/sec |
| Fluidized Bulk Density | 15.7 lb/ft$^3$ |
| Reactor Bed Height | 11 ft |
| Ethylene ($C_2$) Mole % | 40.3 |
| $H_2/C_2$ Molar Ratio | 0.510 |
| 1-Hexene/$C_2$ Molar Ratio | 0.103 |
| TEAL/Ti Molar Ratio | 31 |

With the addition of THF to titanium at a molar ratio of 10:1, the production rate was 184 lb/h and the space time yield was 58 kg/(h-m$^3$). The polyethylene had a density of 0.918 g/cc, a melt index $MI_{2.16}$, $I_2$, of 3.4 dg/min and a residual titanium level of 0.6 parts per million. The level of electrostatic charge in the fluidized bed was measured as described above.

For the purpose of establishing the effect resulting from the addition of THF as the ether to reduce the electrostatic charge in the polymerization medium, the addition of the THF to the polymerization medium was stopped. Without the addition of THF to the polymerization medium, the level of electrostatic charge in the fluidized bed was measured as described above. It was observed from the measurements that the level of electrostatic charge was reduced as a result of the presence of the THF in the polymerization medium.

Examples 7–11
Preparation of Ethylene/-Hexene Interpolymers with Catalyst III with Addition of an Ether to Reduce the Electrostatic Charge The process of Example 6 is followed with the exception that the ether utilized to reduce the electrostatic charge is as follows:

Example 7 diethyl ether,

Example 8 dibutyl ether,

Example 9 diisopropyl ether,

Example 10 tert-butyl methyl ether,

Example 11 dimethoxyethane.

In each of the above Examples 7–11 the level of electrostatic charge in the polymerization medium is expected to be reduced as a result of incorporating the particular ether in the polymerization medium.

Examples 12
Preparation of HDPE with Catalyst III with Addition of an Ether to Reduce the Electrostatic Charge The process of Example 6 is followed with the exception that a homopolymer of ethylene is produced. The level of electrostatic charge in the polymerization medium is expected to be reduced as a result of incorporating the THF in the polymerization medium.

Examples 13–17
Preparation of Ethylene/Olefin Interpolymers with Catalyst III with Addition of an Ether to Reduce the Electrostatic Charge The process of Example 6 is followed with the exception that in place of the 1-hexene is there is utilized the following comonomers:

Example 13 propylene,

Example 14 1-butene,

Example 15 1-pentene,

Example 16 4-methylpent-1-ene,

Example 17 1-octene.

In each of the above Examples 13–17 the level of electrostatic charge in the polymerization medium is expected to be reduced as a result of incorporating THF in the polymerization medium.

Examples 18–20
Preparation of Ethylene/1-Hexene Interpolymers with a Metallocene Catalyst with Addition of an Ether to Reduce the Electrostatic Charge The process of Example 6 is followed with the exception that in place of Catalyst III there is used a metallocene catalyst, supported on silica, as follows:

Example 18 bis(1-butyl-3-methylcyclopentadienyl) zirconium dichloride and methylaluminoxane, Example 19 bis(1-butyl-3-methylcyclopentadienyl) dimethyl zirconocene and tris(perfluorophenyl)borane, Example 20 (tert-butylamido)dimethyl(tetramethyl-$\eta^5$-cyclopentadienyl)silanetitaniumdimethyl and triphenylmethylium tetrakis(perfluorophenyl)borate.

In each of the above Examples 18–20 the level of electrostatic charge in the polymerization medium is expected to be reduced as a result of incorporating THF as the ether to reduce the electrostatic charge.

Films are prepared from the polyolefins of the present invention.

Articles such as molded items are also prepared from the polyolefins of the present invention.

It should be clearly understood that the forms of the invention herein described are illustrative only and are not intended to limit the scope of the invention. The present invention includes all modifications falling within the scope of the following claims.

We claim:

1. A process for polymerizing an olefin and/or an olefin and at least one or more other olefin(s) comprising contacting, under polymerization conditions, in a polymerization medium wherein electrostatic charge is present, the olefin and/or the olefin and at least one or more other olefin(s) with an olefin polymerization catalyst, and at least one ether comprising at least one carbon-oxygen-carbon linkage (C—O—C) having the formula, $$R^1-O(-R^2-O)_m-R^3$$

wherein m ranges from 0 to 30, $R^1$, $R^2$ and $R^3$ independently contain from 1 to 30 carbon atoms and from 0 to 30 heteroatoms of an element, or mixtures thereof, selected from Groups 13, 14, 15, 16 and 17 of the Periodic Table of Elements as defined herein, and further wherein $R^1$, $R^2$ and/or $R^3$ can be linked and form part of a cyclic or polycyclic structure, wherein the ether is present in an amount sufficient to reduce the electrostatic charge in the polymerization medium.

2. The process according to claim 1 wherein the olefin polymerization catalyst comprises at least one metal selected from Groups 3, 4, 5, 6, 7, 8, 9, 10, 11, 12 and 13 of the Periodic Table of the Elements, as defined herein, and mixtures thereof.

3. The process according to claim 2 wherein the metal is selected from the group consisting of titanium, zirconium, vanadium, iron, chromium, nickel and aluminum.

4. The process according to claim 3 wherein the metal is selected from the group consisting of titanium, zirconium and vanadium.

5. The process according to claim 1 wherein the olefin polymerization catalyst is supported on a carrier.

6. The process according to claim 5 wherein the carrier is selected from the group consisting of silica, alumina, magnesium chloride and mixtures thereof.

7. The process according to claim 2 wherein the olefin polymerization catalyst is selected from the group consisting of chromium oxide catalysts, organochromium catalysts, Ziegler-Natta catalysts, olefin polymerization catalysts that polymerize olefins to produce homopolymers and interpolymers of olefins having a molecular weight distribution (MWD) of from 1 to 2.5, metallocene catalysts, cationic aluminum alkyl amidinate catalysts, cationic nickel alkyl diimine catalysts, neutral nickel alkyl salicylaldiminato catalysts, cationic iron alkyl pyridinebisimine catalysts and cationic titanium alkyl diamide catalysts.

8. The process according to claim 7 wherein the olefin polymerization catalyst is selected from the group consisting of chromium oxide catalysts, organochromium catalysts, Ziegler-Natta catalysts, metallocene catalysts and olefin polymerization catalysts that polymerize olefins to produce homopolymers and interpolymers of olefins having a molecular weight distribution (MWD) of from 1 to 2.5.

9. The process according to claim 8 wherein the olefin polymerization catalyst is selected from the group consisting of chromium oxide catalysts, Ziegler-Natta catalysts and metallocene catalysts.

10. The process according to claim 1 further comprising adding a halogenated hydrocarbon to the polymerization medium.

11. The process according to claim 10 wherein the halogenated hydrocarbon is selected from the group consisting of dichloromethane, chloroform, carbon tetrachloride, chlorofluoromethane, chlorodifluromethane, dichlorodifluoromethane, fluorodichloromethane, chlorotrifluoromethane, fluorotrichloromethane and 1,2-dichloroethane.

12. The process according to claim 11 wherein the halogenated hydrocarbon is chloroform.

13. The process according to claim 1 wherein the at least one ether is selected from the group consisting of tetrahydrofuran, diethyl ether, dipropyl ether, diisopropyl ether, dibutyl ether, dioctyl ether, tert-butyl methyl ether, trimethylene oxide and tetrahydropyran.

14. The process according to claim 13 wherein the ether is selected from the group consisting of tetrahydrofuran, diethyl ether, dipropyl ether, diisopropyl ether, tert-butyl methyl ether and tetrahydropyran.

15. The process according to claim 1 wherein the ether is added in a molar ratio of ether to metal component of the olefin polymerization catalyst ranging from about 0.01:1 to about 100:1.

16. The process according to claim 15 wherein the molar ratio of ether to metal component of the olefin polymerization catalyst ranges from about 0.1:1 to about 50:1.

17. The process according to claim 1 wherein the polymerization medium is gas phase.

18. The process according to claim 1 wherein the polymerization medium is slurry phase.

19. The process according to claim 1 wherein the olefin is ethylene and the at least one or more other olefin(s) is selected from the group consisting of olefins having 3 to 16 carbon atoms.

20. The process according to claim 19 wherein the at least one or more other olefin(s) is selected from the group consisting of 1-octene, 1-hexene, 4-methylpent-1-ene, 1-pentene, 1-butene and propylene.

21. The process according to claim 19 wherein the interpolymer resulting from the polymerization of ethylene and at least one or more olefin(s) comprises ethylene in an amount of at least about 50% by weight of the interpolymer.

22. A process for reducing electrostatic charge generated in the polymerization of an olefin and/or an olefin and at least one or more other olefin(s) in a polymerization medium in the presence of an olefin polymerization catalyst, comprising introducing into the polymerization medium at least one ether comprising at least one carbon-oxygen-carbon linkage (C—O—C) having the formula, $$R^1-O(-R^2-O)_m-R^3$$

wherein m ranges from 0 to 30, $R^1$, $R^2$ and $R^3$ independently contain from 1 to 30 carbon atoms and from 0 to 30 heteroatoms of an element, or mixtures thereof, selected from Groups 13, 14, 15, 16 and 17 of the Periodic Table of Elements as defined herein, and further wherein $R^1$, $R^2$ and/or $R^3$ can be linked and form part of a cyclic or polycyclic structure, in an amount sufficient to reduce the electrostatic charge in the polymerization medium.

23. The process according to claim 22 wherein the olefin polymerization catalyst comprises at least one metal selected from Groups 3, 4, 5, 6, 7, 8, 9, 10, 11, 12 and 13 of the Periodic Table of the Elements, as defined herein.

24. The process according to claim 23 wherein the metal is selected from the group consisting of titanium, zirconium, vanadium, iron, chromium, nickel and aluminum.

25. The process according to claim 24 wherein the metal is selected from the group consisting of titanium, zirconium and vanadium.

26. The process according to claim 22 wherein the olefin polymerization catalyst is supported on a carrier.

27. The process according to claim 26 wherein the carrier is selected from the group consisting of silica, alumina, magnesium chloride and mixtures thereof.

28. The process according to claim 22 wherein the olefin polymerization catalyst is selected from the group consisting of chromium oxide catalysts, organochromium catalysts, Ziegler-Natta catalysts, olefin polymerization catalysts that polymerize olefins to produce homopolymers and interpolymers of olefins having a molecular weight distribution (MWD) of from 1 to 2.5, metallocene catalysts, cationic aluminum alkyl amidinate catalysts, cationic nickel alkyl diimine catalysts, neutral nickel alkyl salicylaldiminato catalysts, cationic iron alkyl pyridinebisimine catalysts and cationic titanium alkyl diamide catalysts.

29. The process according to claim 28 wherein the olefin polymerization catalyst is selected from the group consisting of chromium oxide catalysts, organochromium catalysts, Ziegler-Natta catalysts, metallocene catalysts and olefin polymerization catalysts that polymerize olefins to produce homopolymers and interpolymers of olefins having a molecular weight distribution (MWD) of from 1 to 2.5.

30. The process according to claim 29 wherein the olefin polymerization catalyst is selected from the group consisting of chromium oxide catalysts, Ziegler-Natta catalysts and metallocene catalysts.

31. The process according to claim 22 further comprising adding a halogenated hydrocarbon to the polymerization medium.

32. The process according to claim 31 wherein the halogenated hydrocarbon is selected from the group consisting of dichloromethane, chloroform, carbon tetrachloride, chlorofluoromethane, chlorodifluromethane, dichlorodifluoromethane, fluorodichloromethane, chlorotrifluoromethane, fluorotrichloromethane and 1,2-dichloroethane.

33. The process according to claim 32 wherein the halogenated hydrocarbon is chloroform.

34. The process according to claim 22 wherein the at least one ether is selected from the group consisting of tetrahydrofuran, diethyl ether, dipropyl ether, diisopropyl ether, dibutyl ether, dioctyl ether, tert-butyl methyl ether, trimethylene oxide and tetrahydropyran.

35. The process according to claim 34 wherein the ether is selected from the group consisting of tetrahydrofuran, diethyl ether, dipropyl ether, diisopropyl ether, tert-butyl methyl ether and tetrahydropyran.

36. The process according to claim 22 wherein the ether is added in a molar ratio of ether to metal component of the olefin polymerization catalyst ranging from about 0.01:1 to about 100:1.

37. The process according to claim 36 wherein the molar ratio of ether to metal component of the olefin polymerization catalyst ranges from about 0.1:1 to about 50:1.

38. The process according to claim 22 wherein the polymerization medium is gas phase.

39. The process according to claim 22 wherein the polymerization medium is slurry phase.

40. The process according to claim 22 wherein the olefin is ethylene and the at least one or more other olefin(s) is selected from the group consisting of olefins having 3 to 16 carbon atoms.

41. The process according to claim 40 wherein the at least one or more other olefin(s) is selected from the group consisting of 1-octene, 1-hexene, 4-methylpent-1-ene, 1-pentene, 1-butene and propylene.

42. The process according to claim 40 wherein the interpolymer resulting from the polymerization of ethylene and at least one or more olefin(s) comprises ethylene in an amount of at least about 50% by weight of the interpolymer.

* * * * *